No. 606,851. Patented July 5, 1898.
H. WARE.
RAILWAY TIE PLATE SURFACER AND GAGE.
(Application filed Apr. 18, 1898.)
(No Model.)
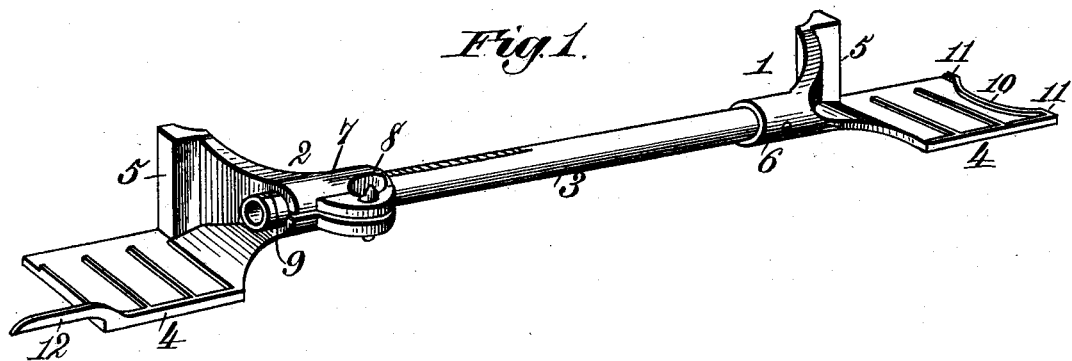
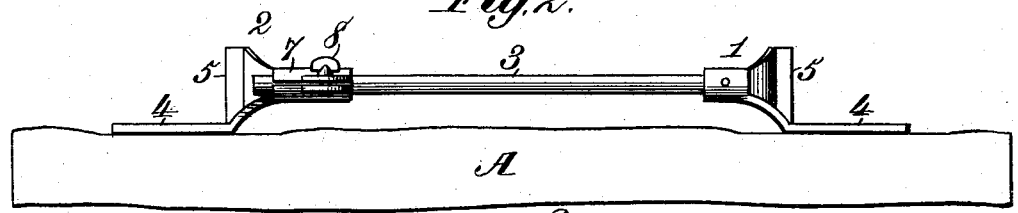
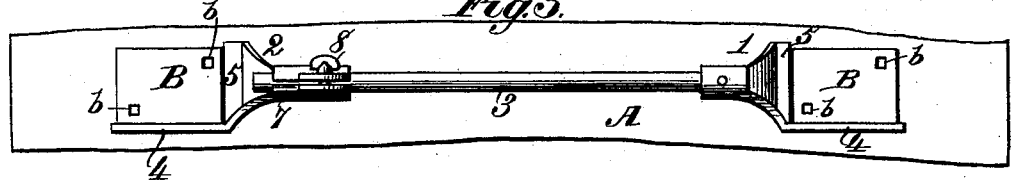
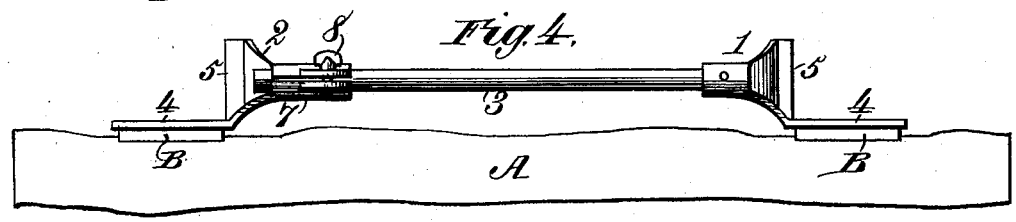
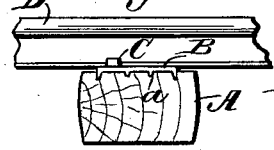
Witnesses
Robert Everett
J. B. Keefer
Inventor
Henry Ware
By James L. Norris
Atty.

UNITED STATES PATENT OFFICE.

HENRY WARE, OF SPRINGVILLE, NEW YORK.

RAILWAY-TIE-PLATE SURFACER AND GAGE.

SPECIFICATION forming part of Letters Patent No. 606,851, dated July 5, 1898.

Application filed April 18, 1898. Serial No. 677,990. (No model.)

*To all whom it may concern:*

Be it known that I, HENRY WARE, a citizen of the United States, residing at Springville, in the county of Erie and State of New York, have invented new and useful Improvements in Railway-Tie-Plate Surfacers and Gages, of which the following is a specification.

This invention relates to a railway-tie-plate surfacer and gage, and has for its object to provide a combination tool or implement designed to be employed in leveling uneven parts of a rough-hewed railway-tie at points where tie-plates or rail-supports are to be embedded and also to gage and square the said tie-plates in their proper relative positions for the two track-rails and to test the level of said plates after they have been embedded in the tie.

The purpose of the implement is to facilitate a proper preparation of railway-ties and the embedding of tie-plates therein with accuracy and at the required gage, so that when the ties are put in the track these plates will come in proper position beneath the rails.

Owing to various difficulties, objections, and unsatisfactory results incident to usual methods of applying and embedding tie-plates they have not as yet come into very general use, though they offer many important advantages in contributing to stability and evenness of the track and in lessening the cost of maintenance.

For many reasons it is preferable to properly locate, gage, and embed the tie-plates before the ties are put into the track, thereby lessening the labor and avoiding disturbance of the track and respiking of the ties, as is often required when the plates are attached after the ties are placed; but it is important that the tie-plates should be accurately located and gaged, so that they will come properly under the rails in the required plane and so that the holes in said tie-plates will occupy the exact positions required for passage of the spikes that are to secure the rails. To this end the tool that I have designed comprises means for testing the level of the tie-plates and parts of the tie in which they are embedded and for squaring and adjusting the gage of the tie-plates, as required.

My invention consists in features of construction and novel combinations of parts in a railway-tie-plate surfacer and gage, as hereinafter more particularly described and claimed.

In the annexed drawings, illustrating the invention, Figure 1 is a perspective of the combined tie-plate surfacer and gage. Fig. 2 is an elevation of the tool, showing its use on a tie to ascertain the level of the same at points where the tie-plates are to be embedded. Fig. 3 is a plan showing the tool as used to square and gage the tie-plates. Fig. 4 is an elevation showing the tool as used for testing the level of the embedded tie-plates. Fig. 5 is a cross-section of a railway-tie, showing a rail spiked to the tie-plate and tie. Fig. 6 is a plan showing the implement as used for gaging tie-plates after ties are put into the track.

The letter A designates a railway cross-tie, and B denotes a tie-plate. The tie-plates B are made from any suitable metal. They are rectangular in form, and the under side of each is roughened or provided with projections or corrugations $a$ for engaging in the tie when the plate is embedded or set. Each tie-plate B is provided with holes $b$ for passage of the spikes C, that are to secure a track-rail D, Fig. 5, the said holes being suitably located with reference to the width of the rail-base.

It is important that the two tie-plates B for each cross-tie A should be embedded or secured in the same plane; also, that they should be gaged a proper distance apart and be accurately set or squared with relation to the track-rails, so that the holes $b$ will be exposed at just the right points for passage of the spikes that are to fasten the track-rails in required position. My invention consists in an implement for quickly and easily accomplishing these purposes and may be described as follows:

The tie-plate surfacer and gage comprises two heads, (designated by the reference-numerals 1 and 2, Figs. 1 to 4.) These heads 1 and 2 are connected by a rod 3, that is preferably tubular for the sake of lightness. Each head of the tool is formed with what may be termed a "surfacer" 4, consisting of a plate that is accurately flattened or plane-surfaced on opposite sides and along its side edges. The surfacers 4 of the two heads 1 and 2 are accurately in the same plane, so as to determine simultaneously the level of two separated points on a railway cross-tie where the tie-plates are to be embedded. Each head 1 and 2 comprises also a straight-edge 5, located at right angles to the inner face of the surfacer, at or near its inner end. The straight-edge 5 is thus adapted to serve, in conjunction with the inner face of the surfacer 4, as a square to be used in squaring and gaging the tie-plates, so that they may be accurately set or embedded at the required distance apart and in such relation to the rail-braces as to permit secure spiking of the rails in proper position.

In order to provide for adjustment of the tool to varying requirements of gage, the connecting-rod 3 has one end firmly riveted or otherwise secured in a socket 6 of the tool-head 1, the socket of the other head 2 being formed as a split clamp 7, the jaws of which are provided with a thumb-screw 8 for securing the adjustable head 2 at any required point on the connecting-rod. Thus by loosening the thumb-screw 8 the adjustable head 2 can be moved toward and from the fixed head 1 to meet any requirements of gage for the track and tie-plates. The projecting end of the connecting-rod 3 is preferably provided with a scale 9, graduated to fractions of an inch, so as to accord with requirements of differently-sized tie-plates and also to regulate accurate adjustment of the tool for variations of track-gage, as at curves. It will be seen that the connecting-rod 3 is located at a sufficient level above the acting parts or surfaces of the tool to readily permit the tool to be effectively used on extremely-uneven surfaces.

To practically apply this implement, it is to be first adjusted so that the heads 1 and 2 will be the proper distance apart to correspond with the desired track-gage and with the dimensions of the tie-plates that are to be used. The surfacers 4 are brought accurately into the same plane, and the thumb-screw 8 is then tightened to secure the adjustable head.

Where hewn or sawed cross-ties are to be used, it will generally be necessary to determine the level of the points where the tie-plates B are to be embedded or set. This is accomplished by laying the implement onto the tie, as shown in Fig. 2, with the surfacers 4 placed flatwise on the proposed locations of the tie-plates. If these points are found to be not sufficiently in the same plane, the surfacers 4 will indicate the uneven place or places that will have to be leveled with an adz or otherwise. The tie being shown to be level, or substantially so, at required points, the tool will then be turned partly over, as shown in Fig. 3, so that the straight-edges 5 will be in contact with the spots where the tie-plates B are to be located. As before observed, each straight-edge 5 forms a square with the inner face of the adjacent surfacer. One of the tie-plates is then put into the angle formed by the straight-edge 5 and inner side of surfacer 4 on what is known as the "line end" of the tie. Thus this tie-plate is accurately squared to the position to be occupied by a track-rail. The tool is then removed, leaving the tie-plate in position, and this tie-plate is then to be set or embedded by means of suitable appliances, such as a setting-maul rested carefully on said tie-plate and subjected to the blow of a sledge, whereby the projections or corrugations a of said plate are firmly embedded in the tie. The tool is then put back on the tie in the position represented in Fig. 3, so that the second tie-plate can be placed to accurately conform to the required position with relation to the tie-plate previously set. The tool having been again removed, this second tie-plate will now be embedded the same as the first. If desired, the tool can now be applied, as shown in Fig. 4, with the surfacers 4 turned flatwise to test the surface-level of the embedded tie-plates. The position and level of these tie-plates being found satisfactory, the tie is now ready to be placed in the track.

It will be obvious that by aid of this tool the tie-plates can be quickly and accurately applied to a railway cross-tie at the proper gage or distance apart before the tie is placed in the track and in such relation to the rail-braces that there will be no difficulty in subsequently entering through the holes b the spikes that are to secure the rails.

The implement may be made of iron, and its several parts are so proportioned that it is comparatively light and may be easily handled.

As shown in Fig. 6, the fixed head 1 may have the end of its surfacer 4 made on a concave or arc 10, with end points 11 in the same plane. This will enable that end of the implement to be placed closely and accurately against the web of a rail that is already set. Thus if it is desired to attach tie-plates to ties that are already in the track one track-rail will first be raised, the fixed head 1 of the implement will be placed against the web of the other rail, as shown in Fig. 6, and the adjustable head 2 having been previously adjusted to the required gage a tie-plate will be placed against the square end of the surfacer 4 of the adjustable head and may be properly embedded, as above described. The rail on this side of the track can be then replaced, the other rail removed, and the implement be then reversed for gaging the required position of the other tie-plate.

Obviously the implement can be employed in several different ways for properly and accurately adjusting the tie-plates of a railway-track. If desired, the adjustable head 2 may carry at one corner of its surfacer 4 an arm 12, Figs. 1 and 6, to assist in squaring the tie-plates when they are being attached to ties already in the track.

When the implement is being used to ascertain the level of the points where the tie-plates B are to be set or embedded, it will be laid as flat as possible upon the top of the tie A, as shown in Fig. 2; but in using the implement for the purpose of accurately squaring or adjusting a tie-plate on a tie that is already laid in the track it is not necessary that the fixed head 1 should rest flat or level on the top of the tie, for when placed as shown in Fig. 6 the slight inclination given to the implement by resting its fixed head against the rail-web above the rail-base will not interfere with a proper employment of the head 2 for squaring the tie-plate. It will be noticed that the arm 12 is undercut or has its lower edge above the level of the under side of the plate 4, so that it cannot come in contact with the tie either when the implement is being used for adjusting a tie-plate or for leveling the surface of a tie. This arm 12, being substantially at right angles to one edge of the plate 4, forms therewith a square or pocket that assists in accurately setting the tie-plate. If preferred, however, the arm 12 may be omitted.

What I claim as my invention is—

1. A railway-tie-plate surfacer and gage, comprising a rod provided at its ends with heads having surfacers in the same plane for leveling tie-plates and straight-edges at right angles to the inner faces of said surfacers for squaring and gaging the tie-plates, substantially as described.

2. A railway-tie-plate surfacer and gage, consisting of a rod having at one end a fixed head and at the other end an adjustable head, the said heads being provided with surfacers in the same plane for leveling tie-plates and having straight-edges at right angles to the inner faces of said surfacers for squaring and gaging the tie-plates, substantially as described.

3. A railway-tie-plate surfacer and gage, consisting of two heads provided with surfacers in the same plane for leveling tie-plates and having straight-edges at right angles to the inner faces of said surfacers for squaring and gaging the tie-plates, a rod connecting the said heads and on which one head is adjustable to accord with the required gage, the said connecting-rod being located at an elevation above the surfacers and having one end provided with a scale adjacent to the adjustable head, and means for securing said adjustable head in required position on said rod, substantially as described.

4. A railway-tie-plate surfacer and gage consisting of two heads provided with surfacers in the same plane, one fixed and the other adjustable, the surfacer on the fixed head being concaved at its end, a rod connecting the said heads and having its end provided with a scale adjacent to the adjustable head, and means for securing the adjustable head on said rod, substantially as described.

5. A railway-tie-plate surfacer and gage consisting of two heads provided with surfacers in the same plane, one fixed and the other adjustable, the surfacer on the fixed head being concaved at its end and the surfacer on the adjustable head being provided with an arm at one corner, a rod connecting the said heads, and means for securing the adjustable head on said rod, substantially as described.

In testimony whereof I have hereunto set my hand in presence of two subscribing witnesses.

HENRY WARE.

Witnesses:
ROBERT MORRIS,
JAMES P. BARTLETT.